United States Patent [19]

Sugano et al.

[11] 4,217,322
[45] Aug. 12, 1980

[54] PROCESS FOR EXTRUDING SYNTHETIC RESIN AND DIE FOR USE THEREIN

[75] Inventors: Katsumi Sugano, Kobe; Takeshi Hashimoto, Amagasaki; Shinzi Hashizume, Kobe; Yoshio Ikegami, Miki; Shin'ichi Fukumizu, Kobe, all of Japan

[73] Assignee: Kobe Steel, Limited, Kobe, Japan

[21] Appl. No.: 924,556

[22] Filed: Jul. 14, 1978

[30] Foreign Application Priority Data

Jul. 14, 1977 [JP] Japan ............................ 52-84709

[51] Int. Cl.² .................................................. B29B 5/00
[52] U.S. Cl. ............................ 264/176 R; 425/133.5; 425/461; 425/466
[58] Field of Search ........................ 264/176 R, 108; 425/461, 466, 133.5

[56] References Cited

U.S. PATENT DOCUMENTS

| | | | |
|---|---|---|---|
| 1,234,017 | 7/1917 | Hanley, Jr. | 425/466 |
| 1,438,231 | 12/1922 | Goodenberger | 264/176 R |
| 2,403,476 | 7/1946 | Berry et al. | 264/176 R |
| 3,080,608 | 3/1963 | Van Riper | 425/466 |
| 3,125,620 | 3/1964 | Skinner | 425/466 |
| 3,256,560 | 6/1966 | Adomaitis | 264/108 |
| 3,294,882 | 12/1966 | Lutzmann et al. | 264/95 |
| 3,549,735 | 12/1970 | Moss | 264/108 |
| 3,559,239 | 2/1971 | Work et al. | 425/133.5 |
| 3,994,654 | 11/1976 | Chyu | 264/176 R |

FOREIGN PATENT DOCUMENTS

51-68671 6/1976 Japan.

Primary Examiner—Jeffery R. Thurlow
Attorney, Agent, or Firm—Oblon, Fisher, Spivak, McClelland & Maier

[57] ABSTRACT

A process for extruding a synthetic resin while restricting the resin flow by positively furnishing the resin flow path surface of an extruding die near its resin flow outlet with frictional resistance relative to the resin disclosed also is an extruding die for practicing the above-described method.

11 Claims, 6 Drawing Figures

PROCESS FOR EXTRUDING SYNTHETIC RESIN AND DIE FOR USE THEREIN

BACKGROUND OF THE INVENTION

1. Field of the Invention

This invention relates to a process for extruding a synthetic resin and to a die for use in practising the method.

2. Description of the Prior Art

In extruding generally a synthetic resin sheet or film, it is believed necessary to smooth the resin flow path surface as much as possible in order to obtain a sheet product having a smooth surface and to prevent deterioration of quality due to stagnation of the resin on a resin flow path surface of the extruding die.

In the conventional die having the resin flow path surface smoothed in this manner, local slip of a resin tends to occur on the resin flow path surface of the die if a resin which is extremely slippery with respect to the surface such as an oil-containing polyacetal resin, for example, is extruded into the sheet form. In such a case, the velocity distribution of the resin flow becomes non-uniform at the outlet of the die and a portion having an extremely varying flow velocity within a narrow distance in the direction of width of the die, or a local flow, takes place. This local flow cannot be corrected by such means as adjustment of a choke bar or lip opening.

The local flow arises from the fact that the resin does not slip uniformly over the resin flow path surface of the die. As means for preventing the local flow, therefore, there may be employed such methods as coating of a lubricant or TEFLON in advance onto the resin flow path surface of the die in order to render the resin flow path surface more slippery. The more slippery the resin flow path surface was, however, the more vigorous became the local flow, in accordance with our experiments.

If a sheet-like article is extrusion formed by cooling and withdrawing while the local flow occurs, the resulting sheet product has non-uniformity in its thickness over its widthwise direction; hence, it is impossible to obtain a quality product. For this reason, it has been conventionally believed that a resin extremely slippery relative to the resin flow path surface such as oil-containing resins as exemplified by an oil-containing polyacetal resin, can not be used for extrusion.

SUMMARY OF THE INVENTION

The present invention contemplates obtaining an extruded product having a uniform thickness in a stable manner by eliminating the local flow arising from the slip of the resin on the resin flow path surface of the die and to practically enable the extrusion of those resins which tend to slip on the resin flow path surface such as an oil-containing polyacetal resin.

In other words, quite contrary to the conventional concept in the art that the resin flow path surface must be smooth as much as possible in the ordinary extruding die for the synthetic resin, the present invention intends to restrict the resin flow by rather preventing the slip of the resin on the resin flow path surface of the die and thus eliminating the local flow.

In a process for extruding a synthetic resin, the first embodiment of the invention serves to accomplish these and other objects and provides a process for restricting the resin flow by positively furnishing the inner surface of the resin flow path of the die near the resin flow outlet with frictional resistance to the resin.

The second embodiment of the invention provides a die for extruding a sheet-like synthetic resin characterized in that sand paper is bonded onto the inner wall of die lips forming a flat flow path near the resin flow outlet of the die over its entire width in the widthwise direction.

The third embodiment of the invention provides a die for extruding a sheet-like synthetic resin characterized in that a plurality of parallel grooves are formed on the inner wall of the die lips forming a flat flow path near the resin flow outlet of the die over its entire width in the widthwise direction and in two directions crossing with each other.

The fourth embodiment of the invention provides a die for extruding a sheet-like synthetic resin characterized in that a plurality of parallel grooves are formed on the inner wall of the die lips forming a flat flow path near the resin flow outlet of the die over its entire width in the widthwise direction and right-angled to the extruding direction of the resin.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Preferred embodiments of the present invention will now be explained in further detail with reference to the accompanying drawings.

Figure 1:
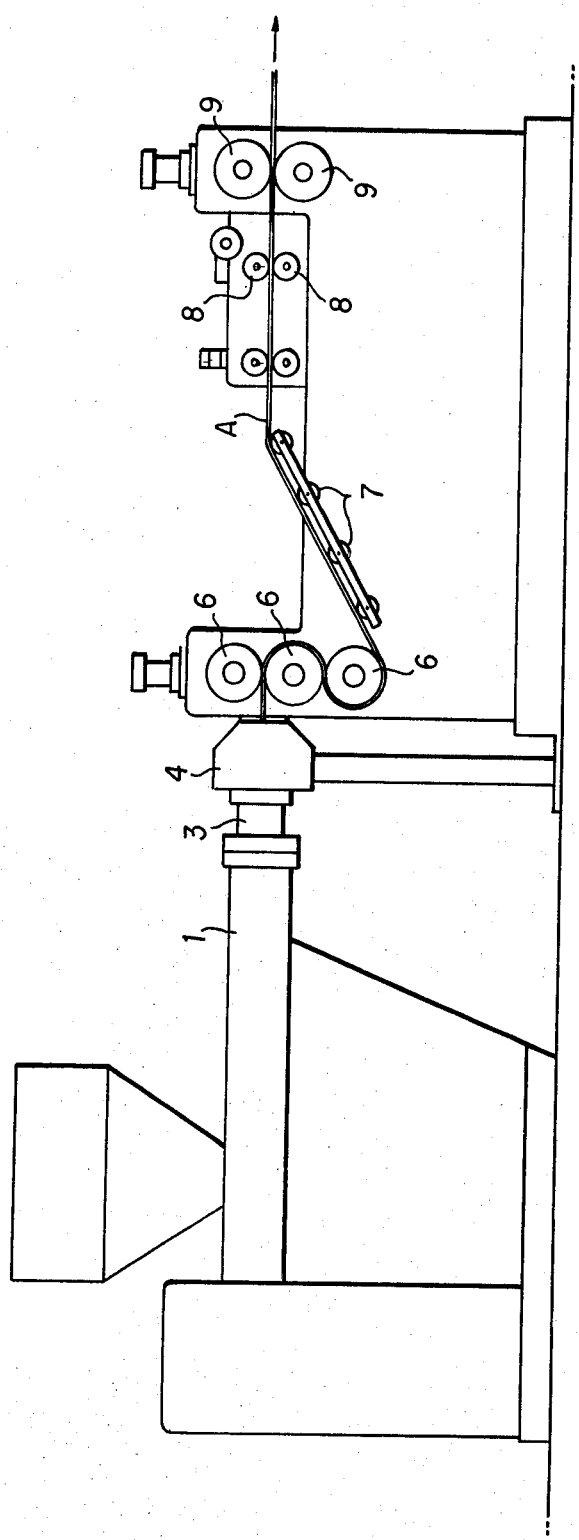
FIG. 1 is a schematic front view of an example of the sheet-like synthetic resin extruding machine.
Figure 2:
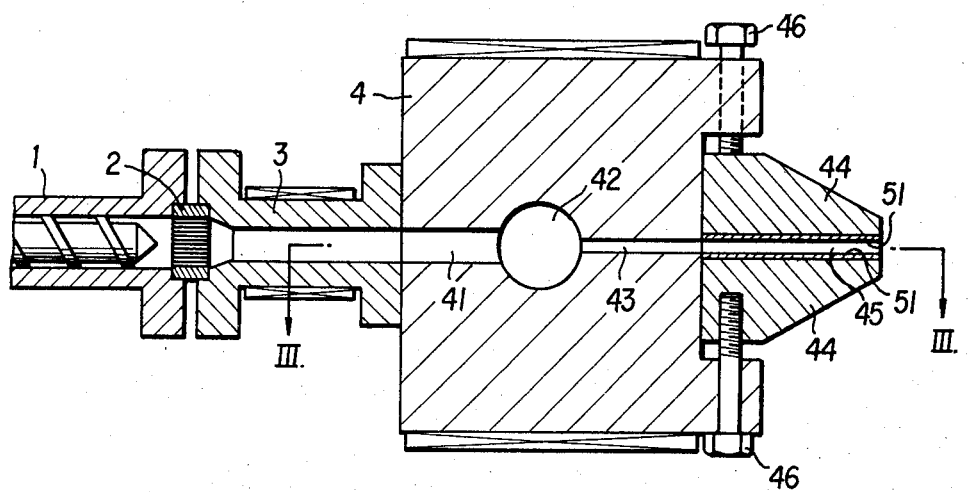
FIG. 2 is a longitudinal sectional front view of the principal portion of an embodiment of the die of the present invention.
Figure 3:
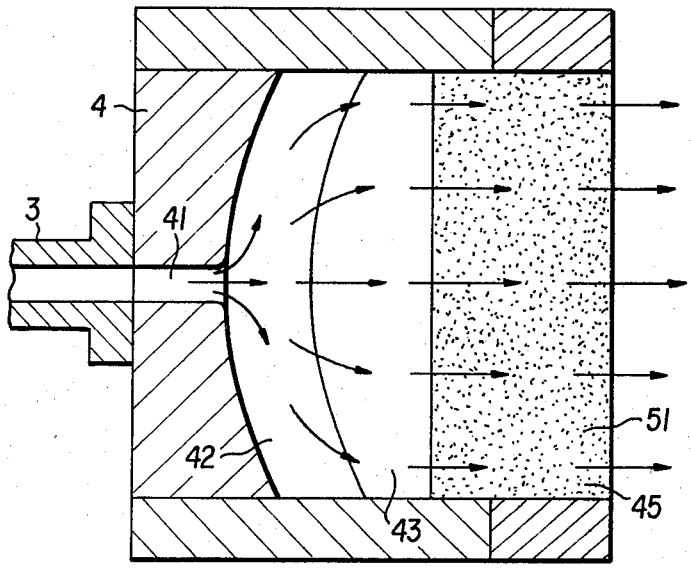
FIG. 3 is a sectional view taken along line III—III of FIG. 2 of an embodiment of the die of the present invention.

The accompanying drawings illustrate the embodiments wherein the present invention is adapted to a sheet extruding machine with FIGS. 1 through 3 showing the basic embodiments. An extruder is generically represented by reference numeral 1 and a sheet extruding die 4 is connected to the tip of the extruder 1 via a breaker plate 2 and an adaptor 3. As shown in FIGS. 2 and 3, the die 4 has a flow path 41 on the inlet side communicated with the adaptor 3, a manifold 42 and a flat flow path 43. At the end portion on the resin outlet side, there is formed a flat flow path (die land) 45 corresponding to the dimension of the product via a pair of upper and lower die lips 44, 44. Sand paper elements 51, 51 are bonded onto the upper and lower inner walls of the resin flow path of the die land 45 and are opposed to each other so as to enhance the wall resistance to the fluidized resin passing through the die land 45.

In FIG. 2, reference numeral 46, designates an adjusting bolt. When the fitting positions of the die lips 44, 44 are adjusted by the adjusting bolt 46, the gap of the die land 45, or the thickness of the product, can be adjusted. Reference numeral 6 is a polishing roll; 7 is a guide roll; 8 is a trimming cutter; and 9, 9 is a withdrawing roll.

Next, explanation will be given as to the manner of extrusion of the synthetic resin sheet A using the abovementioned sheet extruding apparatus. The resin molten kneaded by the extruder 1 first flows through the breaker plate 2 as well as the adaptor 3 into the flow path 41 of the die 41. Inside the die 4 the resin reaches the flow path 43 through the manifold 42, is diffused there flatly, then passed through the die land 45 formed between the die lips 44, 44 having the sand paper 51, 51 bonded onto the inner wall thereof and finally extruded into the sheet form.

Before the resin reaches the die land 45 in this case, such causes slip with respect to the wall of the flow path at each position of the adaptor 3, the flow path 41, the manifold 42 and the flat flow path 43, thereby presumably generating the aforementioned local flow and non-uniformity in the velocity distribution. Accordingly, if the resin is as such extruded from the die outlet, the thickness of the resulting sheet would naturally have quite a non-uniform thickness. Since the resin passes through the die land 45 having the sand paper 51, 51 bonded onto the inner wall thereof, however, the slip of the resin with respect to the wall surface of the flow path is prevented by the surface (i.e. coarse surface) of the sand paper 51, 51. In addition, since the wall surface resistance also becomes greater, non-uniformity that has been generated before the resin reaches this position also is rectified, and the resin is extruded from the die outlet with a uniform flow distribution. Consequently, even if the resin to be extruded is slippery to the resin flow path surface such as an oil-containing polyacetal resin, for example, the resin flow is made uniform over the entire range of its widthwise direction and is thus extruded with a uniform thickness.

The resin sheet A extruded from the die outlet in the abovementioned manner is sequentially taken off by the withdrawing rolls 9, 9 through the polishing roll 6, the guide roll 7 to through the trimming cutter 8 and wound onto a take-up roll (not shown).

Not only in the abovementioned embodiment, the present invention can also be practiced in the following manner.

Figure 4:
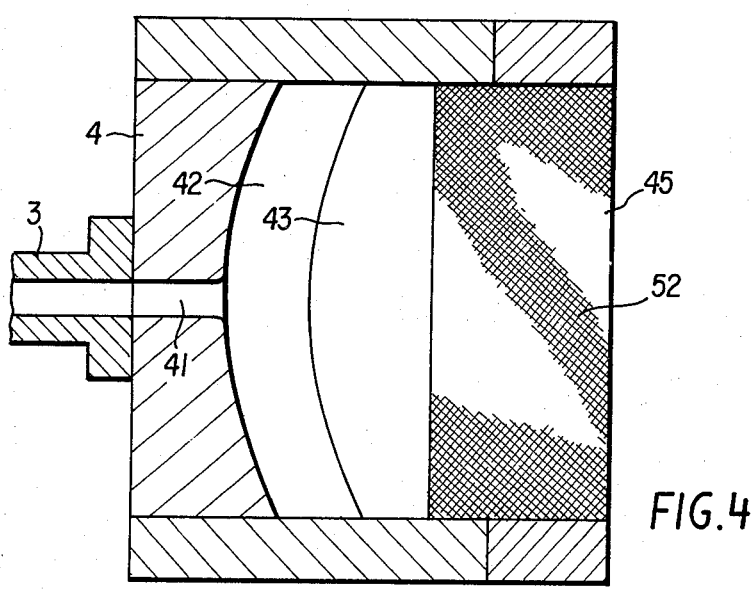
FIG. 4 is a sectional view taken along line III—III of FIG. 2 of another embodiment of the die of the present invention.

In the above-mentioned embodiment the sand paper elements 51, 51 are bonded onto the inner wall of the die lips 44, 44 as means for preventing slip of the resin relative to the resin flow path surface of the die. Alternatively, are embossing finish like the sand paper surface may be directly applied to the inner wall of the die lips, or a plurality of parallel grooves 53 may be formed by knurling, etc. over the entire inner wall of the die lips in the widthwise direction in two directions crossing with each other at right-angles to the extruding direction of the resin and then applied with the surface finish 52 like a file as shown in FIG. 4. Uniformity of the resin flow as well as of the quality can be accomplished when the groove has a pitch of 0.5 mm and a depth of 0.2 mm.

Figure 5:
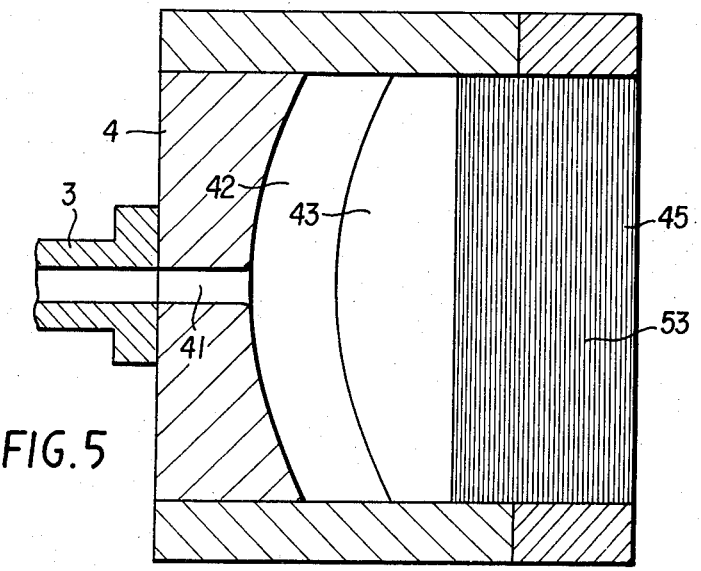
FIG. 5 is a sectional view taken along line III—III of FIG. 2 of still another embodiment of the die of the present invention.

Furthermore, a number of parallel grooves 53 may also be formed in the direction of width at right-angled to the direction of the outflow of the resin as shown in FIG. 5.

In short, a roughed surface having large frictional resistance may be formed on the resin flow path surface near the outlet of the die. In this case, however, special caution should be taken at the time of the surface machining so that the orbit of a cutting edge is not in parallel with the outflow direction of the resin and the roughed surface has communicated grooves formed as uniformly as possible.

Figure 6:
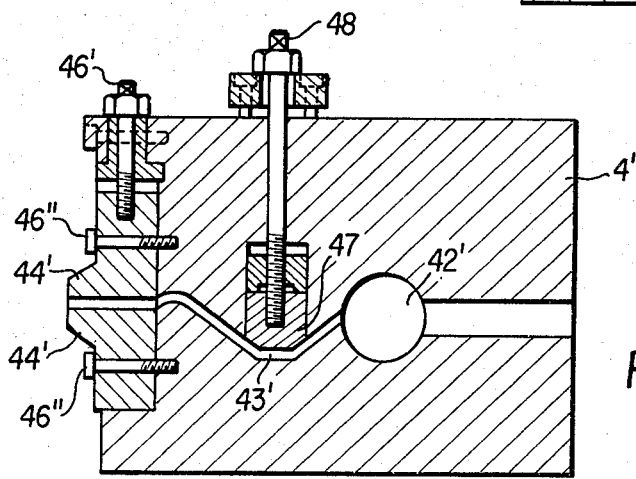
FIG. 6 is a longitudinal sectional view of still another embodiment of the die of the present invention.

FIG. 6 illustrates another embodiment of the sheet extruding die. In comparison with the abovementioned die 4, the die 4' in this embodiment has varying adjusting/securing means for the die lips 44', 44' and includes an adjusting element choke bar 47 disposed inside the flow path 43' ranging from the manifold 42 to the die land 45, the adjusting element 47 being allowed to move back and forth by the adjusting bolt 48 and being capable of adjusting the gap of the flow path. With the exception of these points, the die 4' has basically the same construction as the above-mentioned die 4. In the same way as in the above-mentioned embodiment, therefore, the roughed surface (not shown) may be formed on the inner wall of the die lips 44', 44'. Reference numeral 46', 46' designates the adjusting bolt for the die lips, and 46", 46" denotes a lock bolt for the same.

The above-mentioned roughed surface need not always be disposed over the entire surface of the inner wall of the die lips in the direction of outflow of the resin but instead may be only partial. Further, the roughed surface may not only be disposed on the inner wall of the die lips but may also be disposed on the flow path 43 inside the die 4 or even on the manifold 42.

In this kind of die, it is generally necessary to render the resin flow path surface of the die as smooth as possible in order to satisfy the requirements for the flat surface of the product and so forth, as mentioned previously. To prevent slip of the resin, however, it is necessary to render the resin flow path surface rough. Accordingly, in forming the roughed surface, it is microscopically necessary to sufficiently enhance the flatness of the resin flow path surface over the entire width of the die and necessary to microscopically maintain uniform and required roughness on the surface so long as uniform thickness of the sheet is an essential requisite. For these reasons, it is believed necessary to provide the roughed surface with roughness corresponding to at least JIS 25-S.

Though the resin flow path surface is thus roughed near the die outlet, the resin is extruded into the sheet having a surface by far smoother than that of the die because the sheet product is continuously extruded and withdrawn. Since the surface luster of the extruded sheet can be improved to certain extents by polishing work by the use of the polishing roll 6, etc., the microscopic roughness renders no practical problem to the product.

Although the foregoing embodiments have been explained with primary reference to the extrusion of the sheet using an oil-containing polyacetal resin, the present invention is effective not only for the oil-containing polyacetal resin but also for all those resins which tend to cause slip on the resin flow path surface such as a resin which per se has an extremely small co-efficient of friction, and the resin or other ordinary resins containing a component having an extremely high external lubricating effect such as an oil. In addition, the present invention can be adapted to a wide range of extrusion forming methods including the extrusion of cylindrical products using a pipe die, film products using various dies for film-forming, rod-like products using a rod die, and so forth.

According to the present invention, the following effects can be obtained.

Namely, the resin flow path surface near the die outlet is provided with a higher frictional surface and formed into the roughed surface of communicated grooves defined as uniformly as possible. In consequence, in the extrusion of a resin containing a component insoluble in the resin and having an extremely high lubricating effect such as an oil, the roughed surface of the resin flow path prevents concentration and stagnation of the oil content on the surface, contributes to its uniform dispersion, eliminates the local flow which would otherwise prohibit the extrusion, and provides a uniform flow velocity.

Elimination of the local flow contributes to the uniformity of thickness of the product and improvement in the dimensional accuracy and enables production of a quality product.

Since the resin flow path surface has a large roughness, it is possible to enlarge the wall resistance at the time of outflow of the resin and to elevate the resin pressure inside the extruder so that the melting and kneading effect for the resin inside the extruder can also be enhanced and uniformity of the resin flow and of quality of the product can be further improved.

It is also possible by the present invention to reduce the occurence of poor products, to increase the yield and to drastically improve the production rate. The effect of the present invention can be remarkably exhibited especially in the extrusion of a resin having an extremely small coefficient of friction or a resin or other ordinary resins containing a component having an extremely high lubricating effect such as an oil. Since melting and kneading of these resin materials tend to be incomplete and insufficient inside the extruder, it has conventionally been believed impossible to extrude these materials. However, by elevating the resin pressure inside the extruder to improve the melting and kneading effect as mentioned above, the present invention perfectly solves these problems and enables one to put those resin materials which tend to slip with respect to the resin flow path surface to practical use.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A process for extruding a synthetic resin, including an extruding die with die lips and a diffusing manifold, said die lips being disposed near the outlet of the resin flow and having frictional resistance relative to the resin in order to restrict the resin flow comprising:
   extruding resin through said die;
   passing said resin through said die lips; and
   providing flow resistance while passing said resin through said die lips so as to eliminate local flow of the resin on the resin flow path surface of the die.

2. A die for extruding a sheet-like synthetic resin which comprises:
   an inlet passage formed in said die;
   a diffusing manifold communicating with said passage;
   a flat flow passage communicating with said diffusing manifold;
   first and second die lips communicating with said flat flow passage including sand paper elements bonded onto the inner wall of said first and second die lips, forming a flat flow path therebetween near the outlet of a resin flow in the width direction; and
   means for adjusting the positioning of at least one of said first and second die lips.

3. A die for extruding a sheet-like synthetic resin which comprises:
   an inlet passage formed in said die;
   a diffusing manifold communicating with said passage;
   a flat flow passage communicating with said diffusing manifold;
   first and second die lips communicating with said flat flow passage including a first and second plurality of parallel grooves formed on the inner wall of the die lips, forming a flat flow path therebetween near the outlet of resin flow in the width direction thereof in two directions such that said first plurality of parallel grooves cross said second plurality of parallel grooves; and
   means for adjusting the positioning of at least one of said first and second die lips.

4. A die for extruding a sheet-like synthetic resin which comprises:
   an inlet passage formed in said die;
   a diffusing manifold communicating with said passage;
   a flat flow passage communicating with said diffusing manifold;
   first and second die lips communicating with said flat flow passage, including a plurality of parallel grooves formed on the inner wall of the die lips forming a flat flow path therebetween near the outlet of resin flow in the width direction thereof and at a right angle to the extruding direction of the resin; and
   means for adjusting the positioning of at least one of said first and second die lips.

5. A process for extruding synthetic resin as set forth in claim 1 which further comprises:
   diffusing said resin through said manifold prior to extruding resin through said die lips and forming a flat sheet of resin as a result of passing resin through said die lips so as to contact said frictional resistance.

6. A die for extruding a sheet-like synthetic resin as set forth in claim 2 wherein said means for adjusting the positioning of at least one of said first and second die lips comprises first and second adjustment bolts mounted on said die and engageable with said first and second die lips, respectively.

7. A die for extruding a sheet-like synthetic resin as set forth in claim 3 wherein said means for adjusting the positioning of at least one of said first and second die lips comprises first and second adjustment bolts mounted on said die and engageable with said first and second die lips, respectively.

8. A die for extruding a sheet-like synthetic resin as set forth in claim 4 wherein said means for adjusting the positioning of at least one of said first and second die lips comprises first and second adjustment bolts mounted on said die and engageable with said first and second die lips, respectively.

9. A die as set forth in claim 2 further comprising means for adjusting flow of resin through said inlet passage positioned between said diffusing manifold and said first and second die lips.

10. A die as set forth in claim 3 further comprising means for adjusting flow of resin through said inlet passage positioned between said diffusing manifold and said first and second die lips.

11. A die as set forth in claim 4 further comprising means for adjusting flow of resin through said inlet passage positioned between said diffusing manifold and said first and second die lips.

* * * * *